United States Patent

[11] 3,542,104

| [72] | Inventor | Chester A. Anderson<br>McHenry, Illinois |
| --- | --- | --- |
| [21] | Appl. No. | 760,571 |
| [22] | Filed | Sept. 18, 1968 |
| [45] | Patented | Nov. 24, 1970 |
| [73] | Assignee | Speco, Inc.<br>Schiller Park, Illinois<br>a corporation of Illinois |

[54] MEAT GRINDER WITH PNEUMATICALLY-BIASED RETAINER RING
7 Claims, 6 Drawing Figs.

[52] U.S. Cl. .................................................. 146/189, 18/12
[51] Int. Cl. .................................................. B02c 18/30
[50] Field of Search .................................................. 18/12B, 12SF; 146/186, 187, 188, 189, 190, 191

[56] References Cited
UNITED STATES PATENTS

| 1,504,067 | 8/1924 | Matthies .................. | 146/189 |
| 1,971,491 | 8/1934 | Laemmel .................. | 146/189 |
| 2,581,031 | 1/1952 | Kruzik .................... | 146/190X |

*Primary Examiner*—W. Graydon Abercrombie
*Attorney*—Norman H. Gerlach

ABSTRACT: A meat grinder characterized by the fact that the retainer ring for urging the stationary perforated plate against the coacting rotary cutter is pneumatically biased.

Patented Nov. 24, 1970

INVENTOR
CHESTER A. ANDERSON
By *Norman T. Gerlach*
Attorney

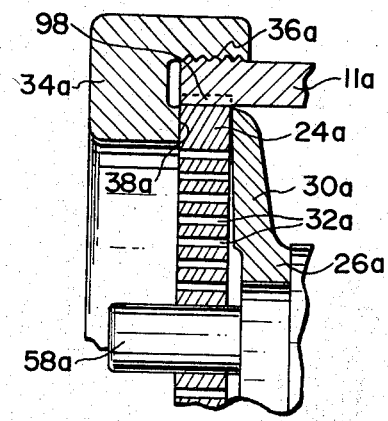
PRIOR ART
FIG. 3a
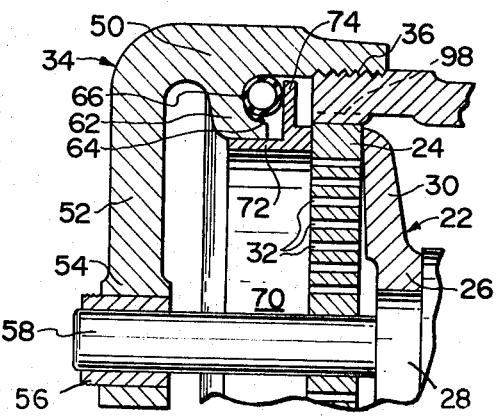
FIG. 3
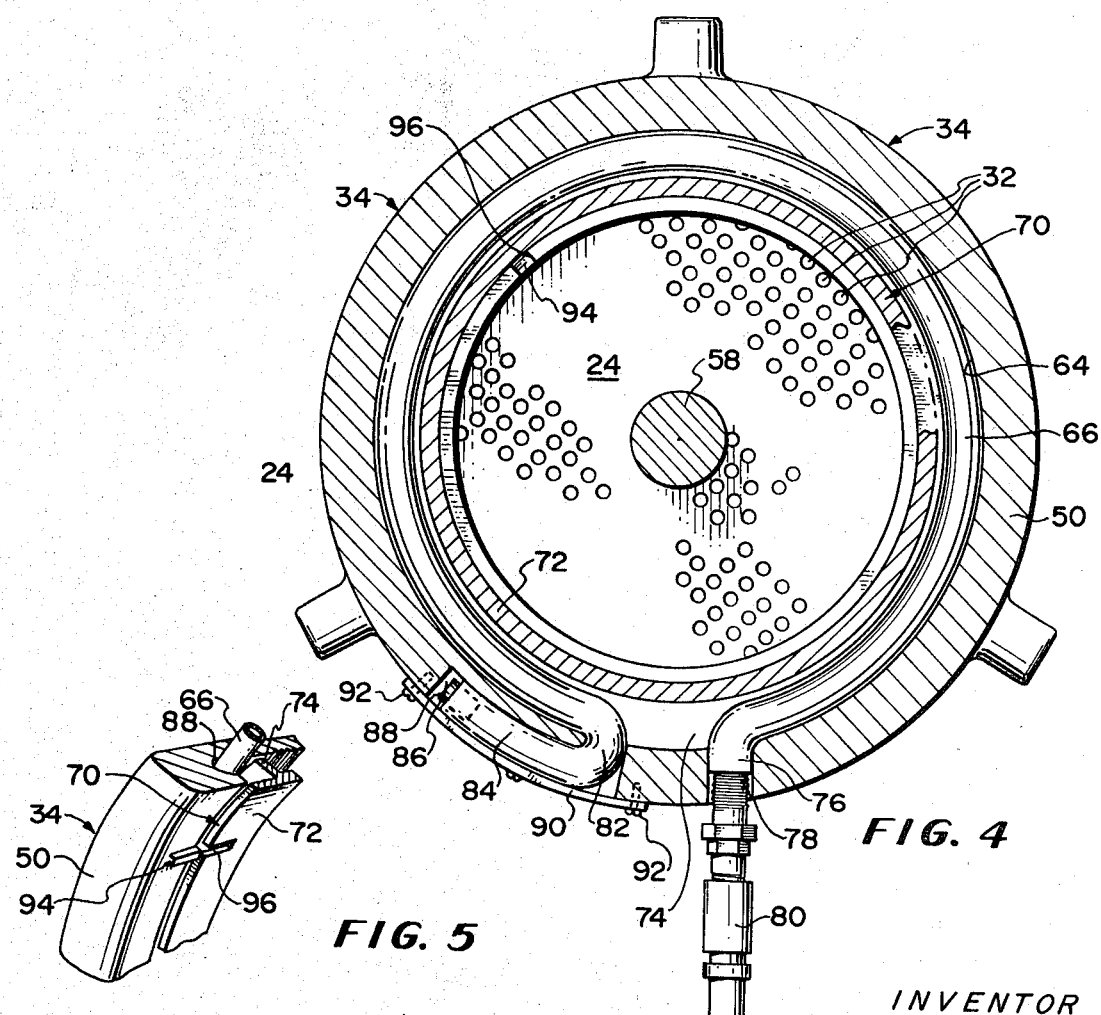
FIG. 4
FIG. 5
INVENTOR
CHESTER A. ANDERSON
By Norman Herlach
Attorney

MEAT GRINDER WITH PNEUMATICALLY-BIASED RETAINER RING

The present invention relates generally to meat grinders and has particular reference to a novel retainer ring assembly by means of which looseness, resulting from wear between the usual stationary perforated plate and the coacting rotary cutter of a conventional or standard meat grinder, is automatically taken up and compensated for.

The invention is specifically concerned with a commercial meat grinder of the type which essentially includes a funnel-shaped hopper into which chunks or pieces of raw meat are placed for subsequent feed or transfer by a rotatable worm through the grinder casting to a plate and cutter assembly from which the ground meat is forcibly discharged through perforations in the plate of the assembly. Ordinarily, the retainer ring of a conventional meat grinder is threaded on the open end of the grinder casting so that when it is tightened to its home or operation on the grinder casting, it bears directly against the peripheral region of the perforated plate and forces or urges the plate against the blades of the rotatable cutter. Obviously, as the plate and cutter blades wear due to continued use of the grinder for its intended purpose, it becomes necessary to tighten the retainer ring by a turning operation in order to maintain the required plate to knife pressure for satisfactory meat grinding. If, as often is the case, wear is not uniform around the periphery of the perforated plate of the plate and cutter assembly, distortion may result due to continued excessive tightening of the ring. In some types of meat grinders, a nut on the discharge end of the worm shaft is used to urge the perforated plate against the cutter parts and thus effect proper plate to knife pressure. In such an instance, excessive tightening of the nut exerts a concentrated pressure at the center of the perforated plate, thus creating a nonplanar condition of the plate with consequent poor shearing taking place between the plate and the cutter blades in the peripheral region of the plate.

A further cause of misalinement between the perforated plate and the blade-equipped cutter involves the use of an outrigger support for the reamer ring, such a support being employed in connection with a number of commercial meat grinders and embodying a bearing stud or pilot shaft which is threaded into the discharge end of the worm shaft, together with a forward spider connection between the retainer ring and the stud. In the operation of such a meat grinder, if the perforated plate undergoes an appreciable amount of wear, bearing misalinement takes place, thus causing the plate and the blade-equipped cutter to wobble in unison.

The present invention is designed to overcome the above-noted limitations that are attendant upon the construction and use of conventional meat grinders of the various types heretofore set forth and, toward this end, the invention contemplates the provision in a conventional meat grinder of a novel outrigger support for the retainer ring, together with an annular expandable and inflatable resilient tube which is effectively interposed between the support and the perforated plate, the tube being maintained under internal expansive pneumatic pressure at all times during use of the meat grinder so that it yieldingly forces the perforated plate against the rotatable blade-equipped cutter in a uniform manner and maintains the shearing edges of the blades of the cutter in perfect linear contact with the adjacent side of the perforated plate at all times, thus compensating for any wear that may take place between the plate and the cutter blades.

The provision of a meat grinder which possesses the aforementioned feature of novelty constitutes the principal object of the present invention and it is a further object to provide such a grinder wherein novel means are provided for supporting and anchoring the aforementioned inflatable tube in its operative position so that it maintains its circular relation with respect to the peripheral region of the perforated plate and exerts pressure against such region uniformly and coextensively therearound.

Other objects and advantages of the invention, not at this time enumerated, will readily suggest themselves as the nature of the invention is better understood.

The invention consists in the several novel features which are hereinafter set forth and are more particularly defined by the claims at the conclusion hereof.

In the accompanying two sheets of drawings forming a part of this specification, one illustrative embodiment of the invention is shown.

In these drawings:

FIG. 3 is an enlarged fragmentary sectional view taken on the line 3–3 of FIG. 1;

FIG. 3a is a sectional view similar to FIG. 3 but illustrating the manner in which a pressure adjustment between the perforated plate and the blade-equipped cutter is made in connection with a conventional or prior art meat grinder;

FIG. 4 is an enlarged transverse sectional view taken on the line 4–4 of FIG. 2; and FIG. 5 is an inside perspective view of a fragment of the retainer ring and its associated expansible inflatable pressure tube.

Figure 1:
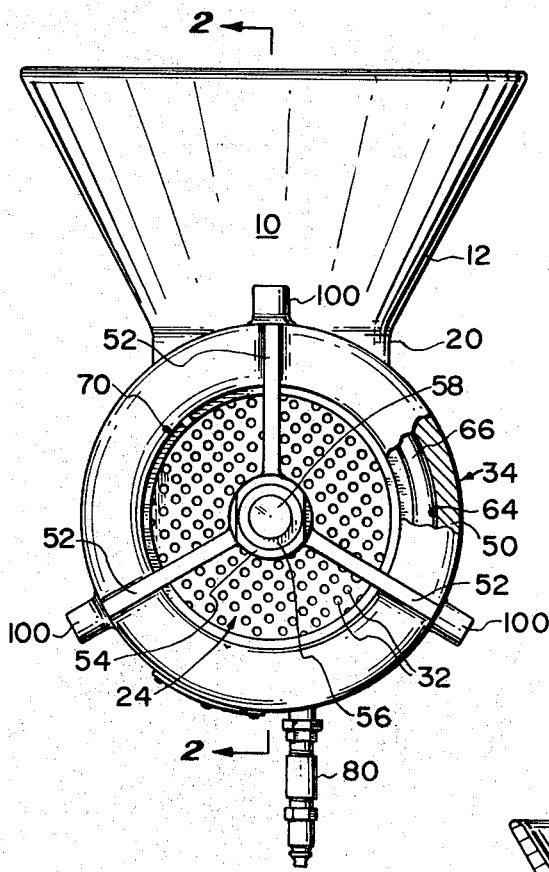
FIG. 1 is a front elevational view of a meat grinder embodying the principles of the present invention, certain parts being broken away and other parts being shown in section for illustrative purposes.
Figure 2:
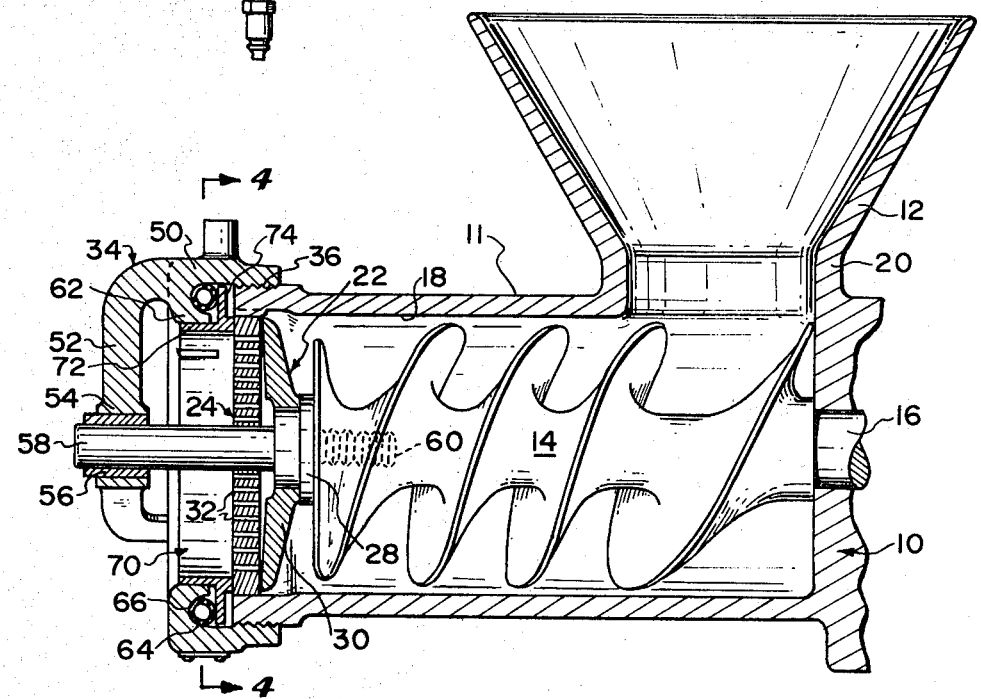
FIG. 2 is a longitudinal sectional view taken substantially along the line 2–2 of FIG. 1.

Referring now to the drawings in detail and in particular to FIGS. 1 and 2, the illustrated form of meat grinder which has been selected as a typical environment for the present invention embodies a horizontally elongated grinder casting 10 which embodies at its receiving end (right-hand end as shown in FIG. 2) the usual upstanding funnel-shaped hopper 12 into which chunks or pieces of meat are placed and then tamped downwards as a preliminary to horizontal pickup and feed by a horizontally positioned worm 14 which is disposed in the grinder casting 10 and has its receiving end (right-hand end as viewed in FIG. 2) connected fixedly to the inner end of a coaxial, rotatable worm shaft 16. The worm 14 is operatively disposed in coaxial relationship within a cylindrical meat channel 18 which is formed in a cylindrical section 11 of the casting 10 and communicates with the hopper 12 through a narrow neck portion 20. The worm shaft 16 is adapted to be driven by an electric motor or other power source (not shown), it being understood that the mounting means for the motor and its driving connection with the shaft 16 are conventional and have no relationship to the present invention so that illustration thereof herein is deemed to be unnecessary.

The meat pieces or chunks which are forced into the confines of the worm 14 are impelled forwardly through the meat channel 18 past a rotary cutter 22 and against a stationary circular perforated grinder plate 24. The cutter 22 comprises a central hub 26 which is mounted on a square or other noncircular boss 28 on the front end portion of the worm 22, together with a series of radially extending blades 30 which cooperate with the adjacent rim regions of a plurality or multiplicity of perforations 32 in the grinder plate 24 in shearing small meat fragments from the meat chunks. These meat fragments are forced forwardly through the perforations 32 and are received in a suitable receptacle (not shown) which is positioned under the front end portion of the meat grinder.

Heretofore, and as illustrated in FIG. 3a, it has been the practice in order to obtain the necessary plate-to-cutter pressure for proper meat shearing to force the perforated grinder plate 24a rearwardly against the cutter 22a by means of a circular retainer ring 34a which is threadedly received as at 36a over the forward rim of the meat channel 18a and presents a rearwardly facing circular bearing surface 38a for contact with the peripheral region of the grinder plate 24a. It is obvious that in connection with such prior art meat grinder structure, as wear takes place between the cutter blades 30a and the perforated grinder plate 24a, it becomes necessary repeatedly to tighten the retainer ring 34a. In connection with the disclosure of FIG. 3a, due to the similarity of parts as between the prior art meat grinder illustration and the meat grinder of the present application, and in order to avoid needless repetition of description, similar reference numerals but with the addition of the letter a have been employed as between the disclosure of FIG. 3a and that of the remaining views in the drawings.

According to the present invention, in order to attain uniform plate-to-cutter pressure at all times and to avoid the necessity of repeatedly tightening the retainer ring as described in connection with the meat grinder structure of FIG. 3a, a modified form of retainer ring 34 is employed. This ring 34 includes a cylindrical body portion 50 which is threadedly received as at 36 over the forward rim of the cylindrical extension 11 of the casting 10 and is provided with a series of three inwardly extending, equidistantly spaced spider arms 52. The latter converge radially inwards to form a central hub 54 within which there is disposed a bushing 56 for the front end of a horizontal pilot shaft 58, the latter having a threaded rear end 60 which is threadedly received in a socket in the front end of the worm 14. The cylindrical body portion 50 of the retainer ring 34 is formed with an inwardly and rearwardly extending internal flange 62 which establishes an annular rearwardly facing recess 64 within which there is seated an inflatable tubular member 66. Such tubular member effectively bears against the peripheral region of the grinder plate 24 through the medium of an intermediate pressure ring 70.

The pressure ring 70 embodies a cylindrical body portion 72 which has a sliding fit with the inner surface of the internal flange 62. The rear rim of the pressure ring contacts the peripheral region of the front face of the perforated grinder plate 24 as clearly shown in FIG. 2. A radially extending annular flange 74 projects outwards from the medial region of the body portion 72 of the pressure ring and bridges the open rear side of the recess 64 so as to receive the rearward thrust of the inflated tubular member 70, the member being floatingly interposed between the flange 74 and the perforated grinder plate 24.

Referring now particularly to FIG. 4 of the drawings, the inflatable member 66 is in the form of an elongated inflatable resilient tube which has a comparatively small diameter and is formed of a suitable elastomeric material such as rubber, either natural or synthetic, or a rubber substitute. The tube is coiled or mounted in the recess 64 so as to be substantially continuous therewith and one end of the tube is turned laterally outwards as at 76 and projects into a radially extending hole 78 in the cylindrical body portion 50 of the retainer ring 34. The laterally turned end 76 of the tube carries a conventional quick-release fitting assembly 80 by means of which the tube 66 may be connected to a suitable source of air under pressure. The other end of the tube 66 is formed with a reverse bend 82 which establishes a reentrant end portion 84 which is nested within a shallow recess 86 in the cylindrical body portion 50 of the retainer ring 34. The extremity of said other end of the tube 66 is closed by a rubber or other resilient plug 88 and the reentrant end portion 84, together with the plug 88, is forcibly compressed within the recess 86 under the influence of a removable plate 90 which overlies the recess 86 and is held in position on the cylindrical body portion of the retainer ring by screws 92.

It will be understood that the inflatable tube 66 is flexible insofar as its linear extent is concerned and that it preferably is cut from a length of tubing stock, the length being subsequently folded or tucked into the recess 64 and its ends turned in the manner previously described to accommodate the hole 78 and the recess 86.

As best illustrated in FIGS. 4 and 5, in order to prevent relative rotation between the pressure ring 70 and the retainer ring 34, an internal rib 94 is formed on the flange 62 and this rib projects into a slot 96 in the body portion 72 of the pressure ring 70. Similarly, in order to prevent relative rotation between the perforated grinder plate 24 and the grinder casting 10, an interlocking tongue and groove connection 98 is provided between these parts as is conventional in the art. A series of three outwardly extending lugs 100 on the outer periphery of the retainer ring 34 facilitates turning of this ring in either direction during assembly and dismantlement of the various grinder parts.

In the operation of the herein described meat grinder, pressurized air, preferably in a range from 60 to 150 p.s.i., is applied to the inflatable tube 66 through the quick-release fitting 80, thus expanding the tube and causing the same to exert a spreading action between the bottom of the recess 64 and the adjacent surface of the radial flange 74 of the pressure ring 70. This spreading action forces the perforated grinder plate 24 rearwardly against the blades 30 of the rotary cutter 22 with the required degree of pressure for proper meat grinding. As wear takes place between the stationary plate 24 and the blades 30 of the cutter, any lost motion which otherwise would occur is taken up by the expansion of the tube 66 without altering the degree of effective pressure between the parts.

The present meat grinder is capable of ease of assembly and dismantlement. Assembly may be accomplished by initially installing the worm and worm shaft unit 14, 16 within the grinder casting 10 and thereafter telescoping the hub 26 of the cutter 22 over the pilot shaft 58 which originally is installed as a component part of the worm and shaft unit. The perforated grinder plate is then telescopically positioned over the pilot shaft 58, after which the inflatable tube 66, with its associated plug 86 and quick-release fitting 80 in place, is installed in the recess 64 in the flange 62 of the retainer ring 34 in the manner previously described. The pressure ring 70 is then positioned in the cylindrical body portion 50 of the retainer ring so as to rest upon the tube 66, after which the latter member with its installed parts is threadedly applied to the forward rim of the cylindrical section 11 of the grinder casting 10 and tightened thereon. Prior to the application of pressurized air to the tube 66, the pressure ring 70 will remain in a floating condition within the retainer ring, but as soon as the air is applied to the tube 66 through the quick-release fitting 80, expansion of the tube will effect the previously described spreading action wherein the desired pressure between the perforated grinder plate 24 and the blades 30 of the cutter 22 is maintained throughout the entire grinding operation.

The invention is not to be limited to the exact arrangement of parts which are shown in the accompanying drawings or described in this specification as various changes in the details of construction may be resorted to without departing from the spirit or scope of the invention. Therefore, only insofar as the invention is particularly pointed out in the accompanying claims is the same to be limited.

I claim:

1. A meat grinder of the character described comprising, in combination, a grinder casting having a forward tubular section defining a cylindrical meat channel provided with an inlet opening for meat, a meat-impelling worm rotatably disposed in said channel and effective, upon rotation thereof, to impel meat forwardly through the channel, a perforated grinder plate projecting across the forward end of the channel, a cutter mounted on said worm for rotation in unison therewith and having a series of blades designed for shearing cooperation with said plate, interengaging means on the plate and tubular section for preventing rotation of the plate while allowing axial shifting thereof toward said cutter, a retainer ring mounted on the forward end of said tubular section, and expansible air pressure means interposed between the retainer ring and plate and effective when expanded to force the plate rearwardly toward said cutter.

2. A meat grinder as set forth in claim 1 and wherein said expansible air pressure means comprises an inflatable tube having a substantially circular configuration the diameter of which is approximately that of the grinder plate and which therefore exerts its expansive force on the peripheral region of the plate.

3. A meat grinder as set forth in claim 1 and wherein said expansible air pressure means comprises an inflatable length of elastomeric tube stock coiled in circular fashion around the peripheral region of said retainer ring.

4. A meat grinder as set forth in claim 3 and including, additionally, a pressure ring interposed between said coiled length of tube stock and the peripheral region of the grinder plate and effective to transmit the expansive force of said length of tube stock to said grinder plate.

5. A meat grinder as set forth in claim 4 and wherein said pressure ring is in the form of a cylindrical body having a sliding fit within the retainer ring, having its rear end bearing against said grinder plate, and embodying a radial flange bearing against the rear side of the coiled length of tube stock.

6. A meat grinder as set forth in claim 5 and including, additionally, a pilot shaft on the front end of the worm and projecting through a central opening formed in the grinder plate.

7. A meat grinder as set forth in claim 6 and including, additionally, a series of radial spider arms on said retainer ring and terminating in a common central hub in which the forward end of the pilot shaft is rotatably journaled.